W. O. LUM.
SYSTEM OF DISTRIBUTION.
APPLICATION FILED MAR. 21, 1914.
1,236,725. Patented Aug. 14, 1917.
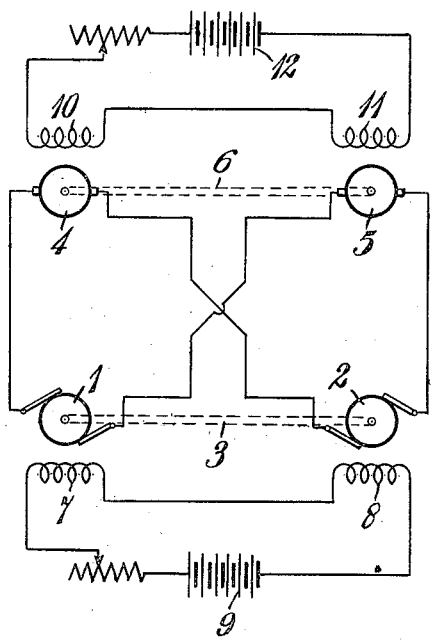

UNITED STATES PATENT OFFICE.

WALTER O. LUM, OF WILKINSBURG, PENNSYLVANIA, ASSIGNOR TO WESTINGHOUSE ELECTRIC AND MANUFACTURING COMPANY, A CORPORATION OF PENNSYLVANIA.

SYSTEM OF DISTRIBUTION.

1,236,725.   Specification of Letters Patent.   Patented Aug. 14, 1917.

Application filed March 21, 1914. Serial No. 826,248.

*To all whom it may concern:*

Be it known that I, WALTER O. LUM, a citizen of the United States, and a resident of Wilkinsburg, in the county of Allegheny and State of Pennsylvania, have invented a new and useful Improvement in Systems of Distribution, of which the following is a specification.

My invention relates to systems of distribution, and it has particular reference to systems in which current is supplied directly by generators to motors that are permanently in circuit therewith.

My invention has for its object to provide a system in which the several elements are so arranged that lower voltages may be employed than in such systems as heretofore arranged.

In systems of distribution in which a plurality of generators supply a plurality of motors, it has been the common practice to connect the generators in series relation and to supply current to the motors also in series relation, at a voltage value which is the sum of those of the several generators. When relatively high voltages are employed for the several generators and motors, the line voltage may become higher than may be conveniently employed.

It is well known that, when two or more shunt-wound motors are mechanically connected to the same load and are electrically connected to separate sources or are connected in parallel relation, the motors tend to assume unequal portions of the load, under extreme conditions, one of the motors may operate as a generator, thereby adding to the load imposed upon the other motor. Controlling mechanisms of a complicated nature are necessary to prevent the operation of one motor as a generator under the conditions above described.

I have provided a system in which two motors, that are mechanically connected, are supplied with current by two generators that are also mechanically connected. The generators and the motors are electrically connected in series, the generators alternating with the motors in the circuit. By means of this arrangement, the voltages employed in the system do not exceed in value that of a single generator. Each motor must necessarily assume its proper share of the load since the circuits of all of the motors are traversed by currents of the same value at all times by reason of the series-circuit relation.

In the accompanying drawing, the single figure is a diagrammatic view of circuits and apparatus embodying my invention.

A pair of electric generators 1 and 2 are mechanically connected together in any suitable manner as, for example, by a shaft 3. A pair of motors 4 and 5 may be similarly mechanically connected by a shaft 6. The generators 1 and 2 are respectively provided with field windings 7 and 8 which are excited in any suitable manner as, for example, by a battery 9. The motors 4 and 5 are respectively provided with field windings 10 and 11 that are similarly excited by a battery 12. The generators 1 and 2 and the motors 4 and 5 are connected in series in a permanently closed circuit, the generators and the motors being alternately disposed in the circuit.

The generators 1 and 2 and the motors 4 and 5 are adapted to operate at substantially equal voltages. It will be evident, therefore, that the voltage values between any two points in the system do not exceed that of a single generator. By means of this arrangement, I avoid the employment of high voltages that are made necessary by the connection of the generators directly in series. It may be assumed that the generators are aranged to operate at 600 volts. If the generators be connected directly in series, a line potential of 1200 volts is the result. By arranging the generators and motors alternately in a circuit in accordance with my invention, the line potential between any two points in the system does not exceed 600 volts, which is that of a single generator.

My invention is adapted to be employed in connection with rolling mills or similar mechanisms where it is not convenient or not possible to use relatively high voltages. It is also adapted to be employed in connection with an installation where the distance between the several generators and the motors is comparatively small.

While I have shown two generators and two motors in my invention, as illustrated and described, it is evident that the number of generators and motors to be employed may be varied, as desired, without departing from the spirit of my invention.

I claim as my invention:

1. In a system of distribution, the combination with a plurality of mechanically connected motors, and a plurality of sources of current for supplying said motors, of an electrical circuit comprising said motors and said sources in series relation and arranged alternately in said circuit.

2. In a system of distribution, the combination with a plurality of mechanically connected motors, and a plurality of mechanically connected generators, of means for electrically connecting said motors and said generators in series relation, said motors and said generators being alternately arranged in the circuit.

3. In a system of distribution, the combination with a plurality of mechanically connected generators adapted to operate at substantially equal voltage values, and an equal number of mechanically connected motors, of means for electrically connecting said generators and said motors in a single circuit to operate as a system at a voltage substantially equal in value to that of a single generator.

4. In a system of distribution, the combination with a plurality of mechanically connected motors and sources of current therefor, of means for insuring that one of said motors cannot operate as a generator while another of said motors operates as a motor, said means comprising means for connecting said sources and said motors in series relation and arranged alternately in circuit.

In testimony whereof, I have hereunto subscribed my name this 13th day of March, 1914.

WALTER O. LUM.

Witnesses:
W. M. CODDINGTON,
B. B. HINES.